COMPLEMENTING MAGNETIC AMPLIFIERS

Filed Dec. 4, 1961

INVENTORS.
BURTIS W. MEYER &
JOHN P. HUSS
BY Wade Koontz and
Martin J. Finnegan
ATTORNEYS

United States Patent Office 3,120,614

Patented Feb. 4, 1964

3,120,614
COMPLEMENTING MAGNETIC AMPLIFIERS

Burtis W. Meyer, Palo Alto, Calif., and John P. Huss, New York Mills, N.Y., assignors to the United States of America as represented by the Secretary of the Air Force Filed Dec. 4, 1961, Ser. No. 157,022
13 Claims. (Cl. 307—88)
(Granted under Title 35, U.S. Code (1952), sec. 266)

The invention described herein may be manufactured and used by or for the United States Government for governmental purposes without payment to us of any royalty thereon.

The present invention relates to bistable devices, and more particularly, to devices for changing binary "zeroes" to "ones" and vice versa.

Bistable devices are employed extensively in computer devices and heretofore it has been found desirable to eliminate the use of vacuum tube discharge devices to reduce the overall size of such computer devices, to ruggedize such devices, and to reduce the incidence of operating failure normally accompanying the use of vacuum tubes.

Magnetic amplifiers including properly poled diodes have been found acceptable for replacing vacuum tube discharge devices and overcome many of the disadvantages inherent in the use of vacuum tube discharge devices.

The present invention is concerned more particularly with complementing magnetic amplifiers. A complementing amplifier is one which will give an output when no input is present thereto or conversely, one which gives no output when there is in fact an input.

It is an object of the present invention to provide a complementing magnetic amplifier which is a novel bistable device. It is a second object of the present invention to provide a complementing magnetic amplifier which is a novel bistable device capable of generating pulses with high power gain. It is a third object of the present invention to provide a complementing magnetic amplifier which is a novel bistable device capable of generating binary "ones" or "zeroes" with extremely good definition. It is a fourth object of the present invention to provide a complementing magnetic amplifier which is a novel bistable device of substantially small size with low-power consumption. It is a fifth object of the present invention to provide a complementing magnetic amplifier wherein a portion of the circuit is clamped to a preselected electrical potential when binary "ones" or "zeroes" are generated therein. Accordingly, the present invention provides a complementing magnetic amplifier for generating binary "ones" or "zeroes" in response to preselected input pulses, which drive a magnetic core material around a preselected hysteresis loop characteristic for said core material. A first source of input pulses drives the core material to saturation in one direction and a first signal winding wound on said core material presents a substantially high impedance to current flowing in said signal winding during this transition. A second source of input pulses drives the core material to saturation in the opposite direction and a second signal winding wound on said core material presents a substantially high impedance to current flowing in said second signal winding during this transition. During this condition, no output pulses appear at an output circuit so that binary "ones" provided by said first source of input pulses are converted to "zeroes." When the first source is removed and a said second source of pulses is connected to said second signal winding oppositely wound on said core material, said second signal winding presents a substantially low impedance to current flowing in said second signal winding, and binary "zeroes" provided by the absence of said first source, are converted to binary "ones."

During the periods wherein binary "ones" are converted to "zeroes," or vice versa, one signal winding is clamped at a predetermined electrical potential for generating output pulses with good definition and high power gain.

These objects and others, and other advantageous features are described in detail in the following detailed description when taken in conjunction with the following drawings wherein.

Figure 1:
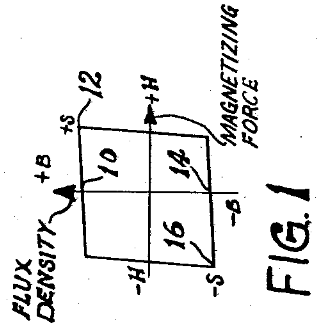
FIG. 1 is a diagram of a hysteresis loop of a core material of a complementing magnetic amplifier of the present invention.

Referring now to FIG. 1, it will be seen that the magnetic amplifiers of the present invention may conveniently utilize cores exhibiting a substantially square hysteresis loop. These cores may be made from a variety of materials, and subjected to different heat treatments to impart desired properties, as is well known to persons skilled in the prior art. Additionally, these cores may be fabricated with a number of different geometries utilizing closed paths only, such as cup-shaped cores. The present invention is not limited to any specific geometries of the cores or to any specific materials therefor, and the examples given are merely illustrative. In the following description bar-type cores are utilized for ease of representation and for showing winding directions.

It will be noted that the curve exhibits several significant points of operation. Point 10 represents a point of plus remanence, +B; point 12 represents saturation, +S, point 14 represents negative remanence, —B; and point 16 represents negative saturation, —S.

Assuming the core is at operating point 10, +B, if a current is passed through the winding in a direction such as to produce a magnetizing force in a direction of +H tending to increase the flux, the core will be driven from point 10, +B, to point 12, +S. During operation under this condition, there is relatively little flux change in the core, and therefore, the coil represents a substantially low impedance so that energy fed to the coil passes therethrough readily and may be utilized to effect a usable output. However, if the core is "flipped" from 10, +B, to point 14, —B, prior to applying a +H pulse, when such a positive pulse is applied the core will tend to be driven from point 14, —B, to the region of point 12, +S. Under this condition, there is a very large flux change in the core, and therefore, the coil presents a substantially high impedance to the applied pulse. Thus, substantially all of the energy applied to the coil when the core is initially at point 14, —B, is expended in flipping the core from point 14 to the region of plus saturation, point 12, and little of this energy passes through the core for providing a usable output if the magnitude of the applied plus H pulse is properly selected. Accordingly, depending on whether the core is initially at point 10 or at point 14, and applied pulse in the plus H direction will be presented with either a low or a high impedance and will effect either a relatively large or small output.

Figure 2:
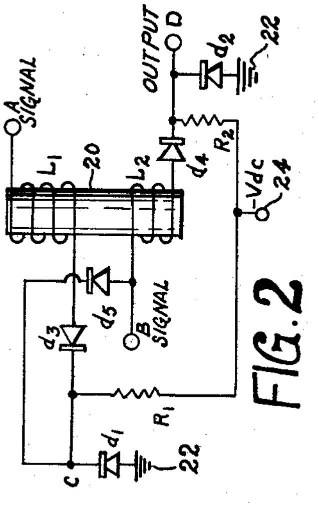
FIG. 2 is a schematic diagram of the bistable device comprising the complementing magnetic amplifier.
Figure 3:
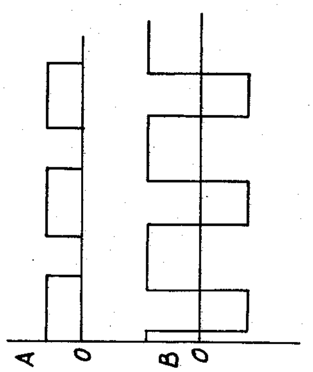
FIG. 3 is a waveform diagram of the input pulses to the complementing magnetic amplifier.

Referring now to FIGS. 2 and 3 there is shown the circuit diagram of a magnetic amplifier of the present invention and significant waveforms for describing its operation. A bar-type core 20, exhibiting a preferred hysteresis loop, has two windings $L_1$ and $L_2$ thereon. Windings $L_1$ and $L_2$ are oppositely wound signal windings. One end of the signal winding $L_1$ is connected to the anode of diode $d_3$, the cathode of which is returned to a common ground 22 through a diode $d_1$, poled as shown, and is returned to a negative D.-C. source 24, through a resistor $R_1$. Thus, the cathode of the diode $d_1$ and the cathode of the diode $d_3$ are connected to a negative source and said diodes are conductive. One end of the signal winding $L_2$ is connected to the anode of a diode $d_4$, the cathode of which is returned to the common ground 22 through a diode $d_2$, poled as shown, and is returned to the negative D.-C. source 24 through a resistor $R_2$. Thus connected, the cathodes of diodes $d_2$ and $d_4$ are connected to a negative source and said diodes are conductive. Additionally, another end of the output winding $L_2$, terminal B, is connected to a point C which is the junction of the cathodes of diodes $d_1$ and $d_3$, through a diode $d_5$, poled as shown.

With waveforms A and B applied to the terminals A and B, respectively, the currents created by these voltage pulses drive the core material completely around the hysteresis loop thereof each cycle. A positive pulse of waveform A causes current to flow in signal winding $L_1$, diodes $d_1$ and $d_3$, and resistor $R_1$. The signal winding $L_1$ has a substantially high impedance during transition from −B, point 14, to +S, point 12. Since the magnitude of the positive pulse is sufficient to drive the core 20 to saturation, +S, the signal winding $L_1$ has a substantially low impedance when core 20 is saturated. Under this condition, the core 20 can be likened to an air core. However, since the signal winding $L_1$ and $L_2$ are oppositely wound, during the period between successive positive pulses of waveform A, the positive portion of a pulse of waveform B will drive the core 20 from saturation +S to saturation −S as current flows through diodes $d_2$ and $d_4$, and resistor $R_2$, and through diodes $d_5$ and $d_1$, and resistor $R_1$. In this manner, the core is driven around the hysteresis loop. As long as pulses are applied to terminal A, signal winding $L_2$ appears as a substantially high impedance to the positive portions of waveform B because of the large flux change in the core and the positive portion of waveform B appears across signal winding $L_2$. A small current, the magnetizing current, flows through signal winding $L_2$, diode $d_4$, and diode $d_2$ to the common ground, but this current is adjusted to be less than the D.-C. current flowing through $d_2$ from the voltage source 24 and resistor $R_2$ so that the output line, terminal D, remains clamped at common ground potential since diode $d_2$ is conductive. Consequently, since the appearance of positive pulses on a signal line are commonly defined as binary "ones," while the absence of pulses is defined as "zero," the complementing magnetic amplifier of the present invention changes "ones" to "zeroes," which is useful in fabricating computer devices. Additionally, it can be seen that if the positive pulses are removed from terminal A, the state of the core does not pass completely around the hysteresis loop, but remains near saturation in the direction of the output winding. Under this condition, signal winding $L_2$ presents a substantially low impedance to the positive portions of waveform B because the flux changes are relatively small and a substantially large current flows in said signal winding $L_2$, cancelling the current flowing through diode $d_2$, connected through resistor $R_2$ to the negative voltage source 24. Thus, the electrical potential at output terminal D rises as diode $d_2$ becomes non-conductive, and the complementing magnetic amplifier functions to change a binary "zero" to a "one." Stated otherwise, the complementing magnetic amplifier generates output pulses 180 degrees out of phase with respect to the input waveform A.

Diode $d_2$, resistor $R_2$, and negative voltage source 24, function to clamp terminal D to the common ground potential when the complementing magnetic amplifier is reading out a "zero," while diode $d_1$, resistor $R_1$, and negative voltage source 24 clamp the terminal C to the common ground potential whenever "ones" are read in at terminal A. A certain electrical symmetry attaches to the circuit of the present invention for clamping a preselected point in the circuit to a preselected electrical potential, for example, the common ground, depending on whether the complementing magnetic amplifier is reading out a "zero" or reading in a "one."

Provision is also made to prevent spurious operation due to induced voltages in the signal windings $L_1$ and $L_2$ when the input waveforms A and B cause the core to flip from one remanence point to another. This phenomenon occurs whenever one signal winding produces a flux change in the core, causing a voltage to be induced in the other winding, having proper polarity to cause the associated diode $d_3$ or diode $d_4$ to conduct. Conduction in signal winding $L_1$ due to induced voltages is prevented by blocking diode $d_3$ with a positive pulse, as for example, with the positive pulse input to terminal B. Thus, positive pulses are coupled to the cathode of diode $d_3$ by connecting the cathode of diode $d_5$ thereto. Conduction in signal winding $L_2$ from induced voltages is prevented by having the negative portion of the waveform B with a greater magnitude than the induced voltages, which blocks diode $d_4$.

Figure 4:
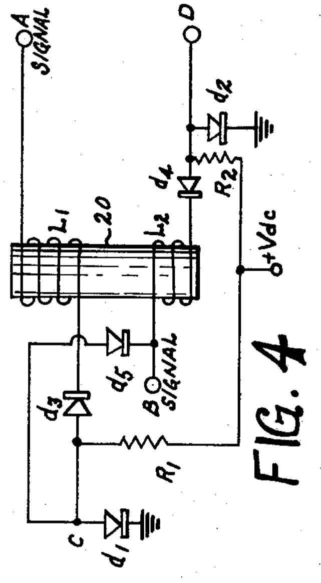
FIGS. 4 and 5 are modifications of the circuit shown in FIG. 2.

FIG. 4 is included to show the arrangements of diodes using reversed polarities. If this arrangement is used, waveforms A and B must be inverted.

Figure 5:
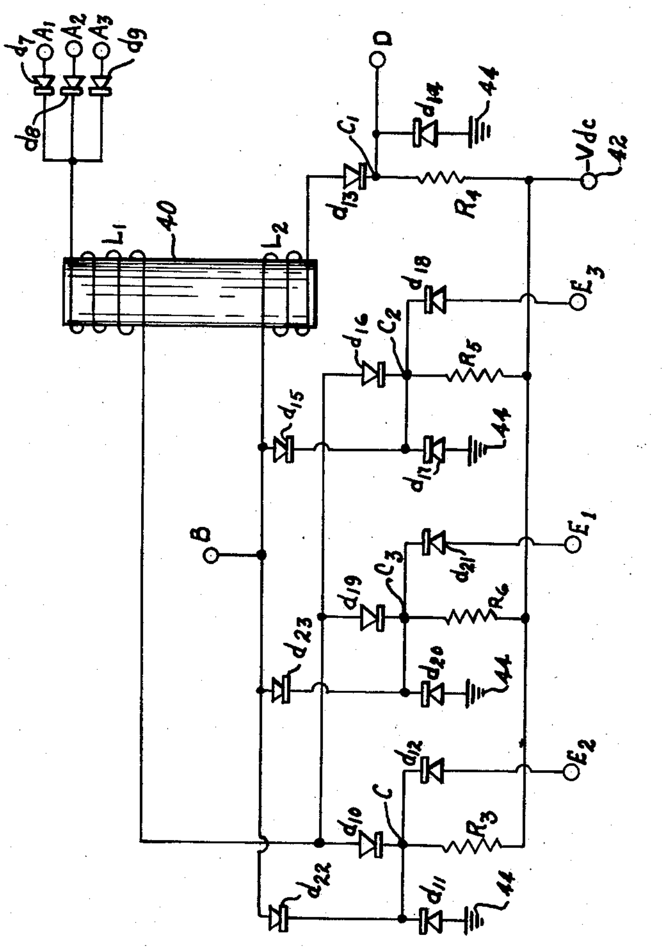

Referring now to FIG. 5, there is shown a circuit based on the principles previously described with regard to the circuit shown in FIG. 2, but capable of accommodating more complex logic problems. Three signal input terminals $A_1$, $A_2$, and $A_3$ are provided for energizing a signal winding $L_1$ wound on a core 40. One end of the signal winding is connected to the cathodes of three diodes $d_7$, $d_8$, and $d_9$. The anodes of said diodes are connected to said terminals $A_1$, $A_2$, and $A_3$. Another end of the signal winding $L_1$ is connected to the anode of a diode $d_{10}$. The cathode of said diode is connected to a negative voltage source 42 through a resistor $R_3$. A diode $d_{11}$ has its cathoed connected to the junction of the diode 10 and the resistor $R_3$, hereinafter called point C, and its anode connected to a common ground 44. A terminal $E_2$ is provided and is connected to the anode of a diode $d_{12}$, the cathode of which is also connected to the point C. With positive pulses applied to a terminal $A_1$, $A_2$, or $A_3$ current flows through the signal winding $L_1$, the diode 10, and the resistor $R_3$. Diode $d_{11}$ may be non-conductive during periods diode $d_{10}$ conducts due to the manner in which said diode $d_{11}$ is poled. A train of positive pulses displaced in time, such as waveform A, may be used to energize the signal winding $L_1$ and the core by connection to the terminals $A_1$, $A_2$, or $A_3$. A subsequent paragraph is included for disclosing the function of the terminal $E_2$.

A terminal B is provided for furnishing pulses varying about a zero axis, such as waveform B, to a signal winding $L_2$ oppositely wound on the core 40. Another end of said signal winding $L_2$ is connected to the anode of a diode $d_{13}$, the cathode of which is connected to a terminal of a resistor $R_4$. Another terminal of the resistor $R_4$ is connected to the negative voltage source 42.

The cathode of a diode $d_{14}$ is connected to the junction of the diode $d_{13}$ and the resistor $R_4$, hereinafter called point $C_1$. The anode of the diode $d_{14}$ is connected to the common ground 44. When the impedance of the core is substantially low and the waveform B is connected to the terminal B, the positive portion thereof causes flow through the diode $d_{13}$ and resistor $R_4$. The diode $d_{14}$ is non-conductive when diode $d_{13}$ conducts due to the manner in which said diode $d_{14}$ is poled. An output terminal D is provided at the point $C_1$.

A diode $d_{22}$ is connected to the end of signal winding $L_2$, which is connected to the terminal B. The cathode of diode $d_{22}$ is connected to the cathode of a diode $d_{11}$, the anode of which is connected to the common ground 44. The cathodes of diodes $d_{22}$ and $d_{11}$ are also connected to the cathode of a diode $d_{10}$, which is connected to one terminal of a resistor $R_3$, the junction hereinafter called point C. The anode of diode $d_{10}$ is connected to one side of the signal winding $L_1$. Another terminal of the resistor $R_3$ is connected to the negative voltage source 42. The diode $d_{22}$ is poled similarly to the diode $d_5$ described previously in the description given for the embodiment shown in FIG. 2 and performs a similar function. Thus, $d_{22}$ provides positive pulses for blocking the cathode of diode $d_{10}$ to prevent conduction in signal winding $L_1$ due to induced voltages. The diode $d_{12}$ is poled to be conductive for the positive portion of an alternating input signal connected to the terminal $E_2$.

In a similar manner and for similar reasons diodes $d_{15}$ and $d_{23}$ are connected to diodes $d_{17}$ and $d_{20}$, respectively. The anodes of said diodes $d_{17}$ and $d_{20}$ are connected to the common ground 44 and the cathodes thereof are connected to the junction of a diode $d_{16}$ and a resistor $R_5$ hereinafter called point $C_2$, and to the junction of a diode $d_{19}$ and a resistor $R_6$, hereinafter called point $C_3$, respectively. Additionally, terminals $E_1$ and $E_3$ are provided and are connected to said points $C_3$ and $C_2$ through diodes $d_{21}$ and $d_{18}$, respectively. Thus, the embodiment shown in FIG. 5 is similar to that shown in FIG. 2, except for the inclusion of input terminals $E_1$, $E_2$ and $E_3$, described subsequently.

As previously mentioned in regard to the circuit shown in FIG. 2, waveforms A and B applied to a terminal $A_1$, or $A_2$ or $A_3$ and B, respectively, drive the core material completely around the hysteresis loop. Also, as long as pulses are applied to said terminal $A_1$ or $A_2$ or $A_3$, signal winding $L_2$ appears as a high impedance to the positive portions of waveform B because of the large flux change in the core 40 and all of the positive portion thereof appears across signal winding $L_2$. A small magnetizing current flows through signal winding $L_2$, diode $d_{13}$, and resistor $R_4$, and diode $d_{14}$ remains conductive since the current flowing from the negative voltage source is not overcome by said magnetizing current. Thus, the terminal D is clamped at common ground potential and "zeroes" are read out for "ones" applied to terminal $A_1$ or $A_2$ or $A_3$. If the pulses at terminal $A_1$ or $A_2$ or $A_3$ are removed, the state of the core does not pass completely around the hysteresis loop and signal winding $L_2$ presents a substantially low impedance to the positive portion of waveform B and a large current flows in said signal winding $L_2$ cancelling the current flowing through resistor $R_4$ from the negative voltage source 42. When this condition exists the potential at terminal D rises as diode $d_{14}$ is non-conductive and binary "zeroes" are changed to "ones."

Positive pulses similar to wave form A can be applied to terminal $E_1$, or $E_2$ or $E_3$. If positive pulses similar to wave form A are applied to terminal $E_1$, $E_2$ or $E_3$ simultaneous with positive pulses of wave form A applied to terminal $A_1$, $A_2$, or $A_3$ of signal winding $L_1$, the state of the core does not pass completely around the hysteresis loop as previously described and signal winding $L_2$ presents a substantially low impedance and a large current flow passes through resistor $R_4$ upon application of wave form B cancelling the current flow therethrough from the negative voltage source 42 and additionally, the current passing through resistor $R_4$ renders diode $d_{14}$ non-conductive and terminal D rises in potential. Thus, "ones" will read out when pulses are applied to terminal $E_1$, $E_2$ and $E_3$ simultaneously, regardless of whether or not pulses are applied to terminals $A_1$ or $A_2$ or $A_3$. Thus, only when pulses are applied to a terminal $A_1$ or $A_2$ or $A_3$ and are missing from at least one of terminals $E_1$ or $E_2$ or $E_3$ will the complementing magnetic amplifier read out "zeroes."

Furthermore, diode $d_{14}$, resistor $R_4$, and negative voltage source 42 function to clamp point $C_1$ or terminal D at common ground potential when "ones" are read in at a terminal $A_1$ or $A_2$ or $A_3$, while diode $d_{14}$, resistor $R_4$ and negative voltage source 42 function to allow point $C_1$ or terminal D to rise above common ground potential when "ones" are not read in at a terminal $A_1$, or $A_2$ or $A_3$. Diodes $d_{11}$, $d_{20}$, and $d_{17}$ resistors $R_3$, $R_6$, $R_5$, and negative voltage source 42 function to clamp points C, $C_3$, and $C_2$ to a common ground potential when pulses are applied to terminal $A_1$ or $A_2$ or $A_3$. It should be noted that the input terminals are not limited to the number shown in FIG. 5.

Having described the principals of the present invention in conjunction with particular embodiments thereof it is desirable not to limit the scope of the present invention to particular circuit components, signal polarities employed, or to specific values of components. Many alternate embodiments will suggest themselves to persons skilled in the prior art without departing from the spirit and scope of the present invention. Accordingly, it is desired to interpret the scope of the present invention by the appended claims.

What is claimed is:

1. A complementing magnetic amplifier comprising a core of magnetic material, a first and a second winding on said core, a first source of pulses connected to said first winding, a second source of pulses connected to said second winding, said sources of pulses being preselected to control the impedance of said windings, means connected to said first and second windings and responsive to current flowing in said windings including first and second devices for returning said first and second windings to a preselected electrical potential during preselected periods dependent upon the impedance of said windings, and output pulses generated at said second device 180 degrees out of phase with respect to pulses of said first source.

2. A complementing magnetic amplifier as described in claim 1 wherein said first and second pulse sources drive said core material around a preselected hysteresis loop for said core.

3. A complementing magnetic amplifier comprising a core of magnetic material, a first and a second winding on said core, a first source of pulses connected to said first winding, a second source of alternating pulses connected to said second winding, said first and second sources being preselected to cooperatively drive said core material around a preselected hysteresis loop characteristic for said core, means connected to said first and second windings and responsive to current flowing therethrough including first and second rectifier devices for clamping said first and second windings to a preselected electrical potential during preselected periods dependent upon the impedance of said windings, and output pulses generated at said second rectifier device 180 degrees out of phase with respect to pulses of said first source during periods said second winding has a substantially low impedance.

4. A complementing magnetic amplifier comprising a core of magnetic material, a first and a second winding on said core, said second winding being oppositely wound from said first winding, a first source of pulses connected to said first winding for driving said core material to a preselected point in the hysteresis loop of said core, a second source of pulses connected to said second winding and cooperating with said first source for driving said core material around said hysteresis loop, means connected to said first and second windings and responsive to current flow therethrough for providing no output pulses during periods said first and second sources are connected to said first and second windings and for providing said output pulses during periods said first pulse source does not energize said first winding.

5. A complementing magnetic amplifier comprising a core of magnetic material, a first and a second winding on said core, said second winding being oppositely wound from said first winding, a first source of pulses connected to said first winding for driving said core material to a preselected point in the hysteresis loop of said core, a second source of pulses connected to said second winding and cooperating with said first source for driving said core material around said hysteresis loop, means connected to said first and second windings and responsive to current flow therethrough for providing output pulses at predetermined periods, said output pulse means including rectifier means poled to provide output pulses during periods pulses to said first winding are not energized by said first source.

6. A complementing magnetic amplifier comprising a core of magnetic material, a first and a second winding on said core, said second winding being oppositely wound from said first winding, a first source of pulses connected to said first winding, a second source of pulses connected to said second winding, said first and second sources cooperating to drive said core material around a preselected hysteresis loop, and means connected to said first and second windings and responsive to current flow therethrough for providing output pulses at preselected periods in time, said output pulse means including first and second rectifier devices, said first rectifier device being conductive and said second rectifier device being non-conductive during periods said pulse sources are connected to said windings, said first rectifier device being conductive for clamping said first winding to a preselected electrical potential during periods said pulse sources are connected to said windings, said second rectifier device being conductive during periods said first source is connected to said first winding.

7. A complementing magnetic amplifier comprising a core of magnetic material, a first and a second winding on said core, said second winding being oppositely wound from said first winding, a first source of spaced pulses connected to said first winding, a second source of pulses connected to said second winding, said first winding having a substantially high impedance during periods said second winding has a substantially high impedance, means including a first rectifier device connected to said first winding and responsive to current flow therethrough during periods said first winding has a substantially high impedance for clamping said first winding to a common electrical potential, and means including a second rectifier device connected to said second winding and responsive to current flow therethrough for generating output pulses 180 degrees out of phase with respect to said first spaced pulses.

8. A complementing magnetic amplifier as described in claim 7 wherein said second rectifier device is non-conductive during periods said first rectifier device is conductive and clamps said first winding to a common electrical potential.

9. A complementing magnetic amplifier comprising a core of magnetic material, a first and a second winding on said core, said second winding being oppositely wound from said first winding, a first source of spaced pulses connected to said first winding, a second source of alternating spaced pulses connected to said second winding, said first and second sources cooperating to drive said core material around a preselected hysteresis loop for said core, means connected to said first and second windings for clamping said windings at a preselected electrical potential at preselected periods, said clamping means including first and second rectifier devices poled to conduct current during periods current flows in said first and second windings, said first winding having current flow therethrough in response to said pulses of said first source, said second winding having current flow therethrough in response to one polarity of said pulses of said second source during periods said first source is removed, an output terminal connected to said second rectifier device, output pulses being generated during periods said second rectifier device is non-conductive.

10. A complementing magnetic amplifier as described in claim 9 including means connected between said second source and said clamping means for suppressing current flow due to induced currents in said first winding.

11. A complementing magnetic amplifier comprising a core of magnetic material, a first and a second winding on said core, said second winding being oppositely wound from said first winding, means for connecting a first source of spaced pulses to said first winding, means for connecting a second source of spaced pulses to said second winding, said first and second sources being preselected to drive said core material around a preselected hysteresis loop for said core, an output terminal connected to said second winding including a first normally conductive rectifier device, means connected to said first winding and to said second source including a second normally conducting rectifier device connected to said first rectifier device for causing said second rectifier device to be non-conductive during periods said second source is connected to said second winding, whereby output pulses exist at said output terminal during periods said second source is connected to said second winding.

12. A complementing magnetic amplifier comprising a core of magnetic material, a first and a second winding on said core, said second winding being oppositely wound from said first winding, a first source of alternating pulses, a second source of alternating pulses, said first and second sources being preselected to drive said core material around a preselected hysteresis loop for said core, first and second input terminals connected to said first winding, a third input terminal connected to said second winding, an output terminal including a normally conducting rectifier device connected to said second winding, said second winding having a substantially low impedance to current flow during periods said first source is connected to said first and second input terminals, said rectifier device being non-conductive during periods said second source is connected to said third input terminal and said second winding having a substantially low impedance, said rectifier device being conductive only during periods said first source is connected to said first input terminal to obtain output pulses at said output terminal 180 degrees out of phase with respect to said pulses of said first source.

13. A complementing magnetic amplifier as described in claim 12 wherein said first and second input terminals have at least one input branch with a rectifier device connected therein and poled to be conductive over a preselected portion of the cycle of said first source connected thereto.

References Cited in the file of this patent

UNITED STATES PATENTS 2,901,636 Torrey et al. ____________ Aug. 25, 1959